March 8, 1927.
R. M. GILSON
1,619,860
ELECTRICAL SWITCHING APPARATUS
Filed April 18, 1925
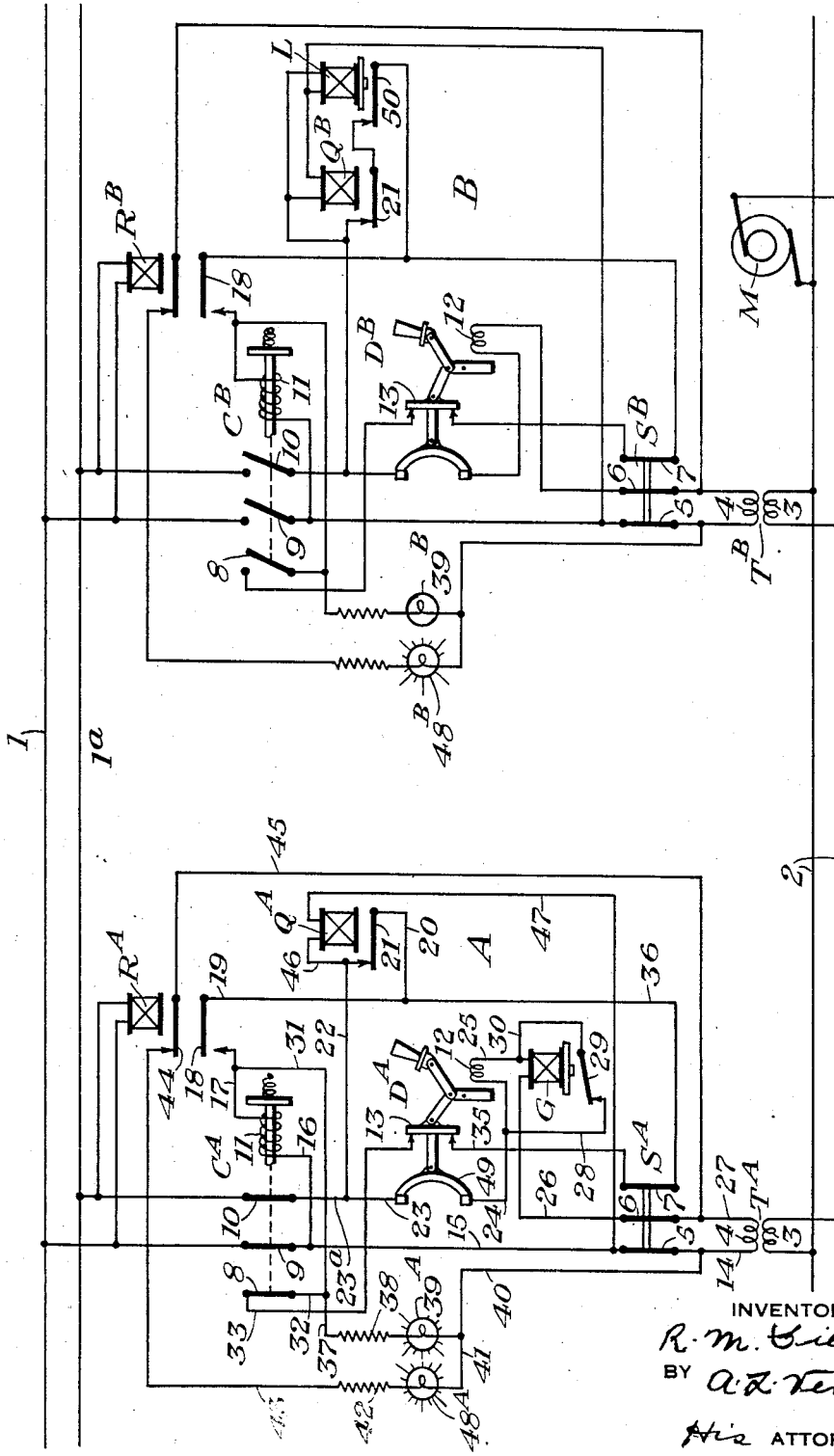
INVENTOR:
R. M. Gilson,
BY A. L. Tencill
His ATTORNEY Patented Mar. 8, 1927.

1,619,860

UNITED STATES PATENT OFFICE.

ROBERT M. GILSON, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL SWITCHING APPARATUS.

Application filed April 18, 1925. Serial No. 24,281.

My invention relates to electrical switching apparatus suitable for use in electrical distributing systems.

I will describe one form of switching apparatus embodying my invention, and will then point out the novel features thereof in claims.

The accompanying drawing is a diagrammatic view showing one form of switching apparatus embodying my invention.

Referring to the drawing, the reference characters 1 and $1^a$ designate the conductors of the transmission line of an electrical distributing system. This transmission line may be used to distribute electric energy to any number of loads, forming no part of my present invention and omitted from the drawing for the sake of simplicity.

The conductors 1 and $1^a$ are normally supplied with alternating current from a main station designated in general by the reference character A, but in case of failure of the apparatus associated with station A, current is supplied to the transmission line from an auxiliary station B. The immediate source of alternating current for each of the stations A and B is a transformer designated by the reference character T with a distinguishing exponent. The primary 3 of each transformer T is normally supplied with alternating current from a suitable source, such as an alternator M, over supply wires 2.

Station A comprises a manually operable three pole single throw switch $S^A$, and an automatic circuit breaker $D^A$ having an operating winding 12 arranged to open the breaker if the current in this winding exceeds a predetermined maximum value. The reference character $C^A$ designates an automatic circuit controller comprising a winding 11 and three contacts 8, 9 and 10, biased to an open position but arranged to be closed when winding 11 is energized.

As hereinbefore stated, the main station A normally supplies current to the transmission line wires 1 and $1^a$, the circuit passing from the left hand terminal of secondary 4 of transformer $T^A$, through wire 14, blade 5 of switch $S^A$, wire 15, and contact 9 of circuit controller $C^A$, to wire 1, and from wire $1^a$, through contact 10 of circuit controller $C^A$, wires $23^a$ and 23, contact 49 of circuit breaker $D^A$, wires 24 and 28, back contact 29 of relay G, wire 30, the winding of relay G, wire 26, blade 6 of switch $S^A$, and wire 27 back to secondary 4 of transformer $T^A$. The relay G is a standard inverse time element relay the function of which will appear hereinafter.

Circuit controller $C^A$ is energized, under normal conditions, over a stick circuit which passes from secondary 4 of transformer $T^A$, through wire 14, blade 5 of switch $S^A$, wires 15 and 16, operating winding 11 of circuit controller $C^A$, wires 17, 31 and 32, contact 8 of circuit controller $C^A$, wire 33, contact 13 of circuit breaker $D^A$, wire 35, blade 7 of switch $S^A$, wires 36 and 20, front contact 21 of a relay $Q^A$, wires 22 and 23, contact 49 of circuit breaker $D^A$, wires 24 and 28, contact 29 of relay G, wire 30, winding of relay G, wire 26, blade 6 of switch $S^A$, and wire 27 back to secondary 4 of transformer $T^A$. It will be plain that this circuit is closed only when relay $Q^A$ is energized, when circuit breaker $D^A$ is closed, and when switch $S^A$ is closed. Furthermore, it will be seen that the circuit includes a contact 8 of circuit controller $C^A$. The circuit is therefore a stick circuit for holding the circuit controller $C^A$ in its energized position after the circuit controller has once been moved to this position as will appear hereinafter.

Relay $Q^A$ is provided with a circuit which may be traced from secondary 4 of transformer $T^A$, through wire 14, blade 5 of switch $S^A$, wires 15 and 47, winding of relay $Q^A$, wires 46, 22 and 23, contact 49 of circuit breaker $D^A$, wires 24 and 28, contact 29 of relay G, wire 30, winding of relay G, wire 26, blade 6 of switch $S^A$, and wire 27 back to secondary 4 of transformer $T^A$. This circuit is closed only when switch $S^A$ is closed and circuit breaker $D^A$ is closed. The relay $Q^A$ is arranged to be energized when this circuit is closed provided the voltage supplied by transformer $T^A$ is above a predetermined value. If, however, this voltage drops below such value, preferably about 85% of the normal voltage of transformer $T^A$, relay $Q^A$ will open. The opening of front contact 21 of this relay will interrupt the stick circuit just traced for circuit controller $C^A$, allowing the contacts of the circuit controller to open and so disconnecting the transformer $T^A$ from the transmission line wires 1 and $1^a$.

Connected across the transmission line wires 1 and 1ª adjacent station A is a relay designated by the reference character R$^A$ which relay for purposes of explanation I will term a "cut-in" relay. Manifestly the relay R$^A$ is energized when current is being supplied to the transmission line but is de-energized when the supply of such current is interrupted. This relay controls a pick-up circuit for circuit controller C$^A$ so that if the circuit controller is de-energized and the relay R$^A$ becomes de-energized current flows from secondary 4 of transformer T$^A$, through wire 14, blade 5 of switch S$^A$, wires 15 and 16, winding 11 of circuit controller C$^A$, wire 17, back contact 18 of relay R$^A$, wires 19 and 20, front contact 21 of relay Q$^A$, wires 22 and 23, contact 49 of circuit breaker D$^A$, wires 24 and 28, contact 29 of relay G, wire 30, winding of relay G, wire 26, blade 6 of switch S$^A$ and wire 27 back to secondary 4 of transformer T$^A$. Having once been energized circuit controller C$^A$ may be retained in its energized condition over the stick circuit already described. The reason for first describing the stick circuit for this circuit controller is that the transmission line wires 1 and 1ª are normally supplied with current from transformer T$^A$ over the circuit controller C$^A$ held in its energized condition by its stick circuit, and the pick-up circuit is used to close the circuit controller under abnormal conditions as will appear hereinafter.

An indicator lamp 39$^A$ is provided with a circuit from secondary 4 of transformer T$^A$, through wires 14 and 40, lamp 39$^A$, impedance 38, wires 37 and 32, contact 8 of circuit controller C$^A$, wire 33, contact 13 of circuit breaker D$^A$, wires 24 and 28, contact 29 of relay G, wire 30, winding of relay G, wire 26, blade 6 of switch S$^A$, and wire 27 back to secondary 4 of transformer T$^A$. This circuit is closed only when circuit breaker D$^A$, circuit controller C$^A$, and switch S$^A$ are all closed, and the lamp 39$^A$ therefore is lighted only when the transmission line is being supplied with current from transformer T$^A$.

A second indicator lamp 48$^A$ is closed when transformer T$^A$ is supplied with current and the transmission line is being supplied with current from any source. The circuit for this second lamp passes from secondary 4 of transformer T$^A$, through wires 14, 40 and 41, lamp 48$^A$, impedance 42, wire 43, front contact 44 of relay R$^A$, and wires 45 and 27 back to secondary 4 of transformer T$^A$.

The two lamps 39$^A$ and 48$^A$ therefore indicate the condition of the apparatus located at station A at all times.

The winding 12 of circuit breaker D$^A$ is connected in shunt with contact 29 of relay G, so that when relay G is energized this winding is placed in the circuit over which transformer T$^A$ supplies current to the transmission line wires 1 and 1ª. The circuit breaker is normally closed but is arranged to be opened by winding 12 if the current through this circuit exceeds a given value. Should this occur the opening of the circuit breaker disconnects the transformer from the transmission line.

The apparatus located at station B is similar to that just described for station A except that relay G is omitted, winding 12 of circuit breaker D$^B$ being connected directly with blade 6 of switch S$^B$, and a slow acting relay L is connected in parallel with relay Q$^B$. The front contact 50 of relay L is connected in series with front contact 21 of relay Q$^B$.

Under normal condition, that is, when the transmission line is being supplied with current from transformer T$^A$, relay R$^B$ located at station B is energized and circuit controller C$^B$ is de-energized, relays Q$^B$ and L are both energized, and circuit breaker D$^B$ is closed. Lamp 48$^B$ is therefore lighted but lamp 39$^B$ is extinguished. I will now assume that some fault occurs at station A which interrupts the supply of current from transformer T$^A$ to the transmission line. Circuit controller C$^A$, of course immediately opens. Relay R$^B$ then becomes de-energized, completing at back contact 18 thereon the pick-up circuit for circuit controller C$^B$. The contacts of this circuit controller are therefore closed and current is supplied to the transmission line from transformer T$^B$. At the same time the closing of contact 8 on circuit controller C$^B$ completes the stick circuit for the circuit controller which is therefore held in its energized condition although the pick-up circuit for the circuit controller is broken by the energization of relay R$^B$.

If the fault which caused the failure of station A is corrected, and it is desired to restore the apparatus to its normal condition, this can be accomplished by opening switch S$^B$. The interruption of current from transformer T$^B$ causes the de-energization of relays R$^A$ and R$^B$. The closing of back contact 18 of relay R$^A$ completes the pick-up circuit for circuit controller C$^A$ and again connects transformer T$^A$ to the transmission line. By the opening of switch S$^B$ at station B circuit controller C$^B$ is immediately de-energized to disconnect the apparatus at station B from the transmission line. If switch S$^B$ is subsequently re-closed, circuit controller C$^B$ will not operate to connect the transformer T$^B$ with the transmission line because relay R$^B$ is now energized by current delivered to the transmission line by transformer T$^A$ and the pick-up circuit for the circuit controller is open at back contact 18 thereon. Under these conditions lamps 48$^A$ and 39$^A$ are both lighted and lamp 48$^B$ is also lighted but lamp 39$^B$ is extinguished.

The apparatus is therefore restored to its normal condition.

When the transmission line is being supplied with current from station B, should the current supplied to the transmission line increase by a substantial amount, as by a short circuit occurring in the line, the circuit breaker $D^B$ would be opened to disconnect transformer $T^B$ from the line. Should this fault occur when station A is feeding the line, relay G would first open its back contact 29 thus placing winding 12 in the feeding circuit, and this winding would then open circuit breaker $D^A$. Relay $R^B$ at station B would then operate to connect the transformer $T^B$ with the line, but if the short circuit still remained, circuit breaker $D^B$ would immediately open to disconnect transformer $T^B$ from the transmission line and protect the apparatus from excessive currents. The operation of circuit breaker $D^A$ is retarded by the inverse time element relay G as will be described hereinafter.

Similarly with either station feeding the transmission line, should the voltage drop below 85% of the normal voltage the relay Q associated with the feeding transformer would open, interrupting the stick circuit for the corresponding circuit controller C and disconnecting the feeding transformer from the transmission line.

I will now assume that the transmission line is being supplied with current from station A and that a break occurs in one of the line wires 1 or $1^a$ between stations A and B. This break causes the de-energization of relay $R^B$ which operates to connect transformer $T^B$ with the transmission line to supply current to the line to the right of the break and current is still supplied to the line to the left of the break from station A. If the break is subsequently repaired it will be obvious that the transmission line would then be supplied simultaneously with current from transformers $T^A$ and $T^B$. It will be noticed however that the connections of the transformers $T^A$ and $T^B$ to the supply wires 2 are reversed so that the currents supplied to the transmission line by these transformers are of opposite instantaneous relative polarity. If the transformers are connected simultaneously to the transmission line, current flowing through each of the circuit breakers $D^B$ will be considerably in excess of the amount of current normally flowing through these breakers. Circuit breaker $D^B$ will immediately open. Circuit breaker $D^A$, however, is arranged to remain closed for a brief time interval. This result is accomplished in the following manner: The back contact 29 on the inverse time element relay G normally shunts winding 12 of circuit breaker $D^A$. When the excessive current flows through the relay G this relay becomes energized and after a time interval which is inversely proportional to the magnitude of the excessive current, the back contact 29 of relay G opens and supplies this excessive current to the operating winding 12 of circuit breaker $D^A$ which immediately opens. If excessive current is still flowing through the circuit when relay G opens, therefore, breaker $D^A$ disconnects the transformer $T^A$ from the transmission line. Under the conditions just described, however, the excessive current is due to the simultaneous connections of transformers $T^A$ and $T^B$ with the transmission line. The opening of circuit breaker $D^B$ disconnects transformer $T^B$ from the transmission line before relay G has time to open its back contact. Circuit breaker $D^A$ therefore remains closed and current continues to be supplied to the transmission line from transformer $T^A$.

I will now assume that station A is supplying current to the transmission line and that a fault occurs between the alternator M and the supply wires 2. The supply of current to the transmission line is therefore interrupted and both relays $R^A$ and $R^B$ become de-energized. Since current is supplied to neither transformer $T^A$ or $T^B$ both circuit controllers $C^A$ and $C^B$ become de-energized and relays $Q^A$, $Q^B$ and L also become de-energized. If, now, the fault is corrected, current is simultaneously supplied to transformers $T^A$ and $T^B$. Relays $Q^A$ and $Q^B$ immediately close their front contacts 21 but relay L being slow acting, a time interval elapses before the front contact 50 of this relay closes. As soon as the front contact 21 of relay $Q^A$ is closed the pick-up circuit for circuit controller $C^A$ is completed over back contact 18 of relay $R^A$ and transformer $T^A$ is therefore connected with the transmission line. The circuit controller $C^B$ does not become energized, however, until front contact 50 of relay L is closed, and during the time interval required for this operation current supplied from transformer $T^A$ to the transmission line energizes relay $R^B$. When relay L does become energized, therefore, back contact 18 of relay $R^B$ will already have been opened, and the closing of front contact 50 on relay L therefore will have no effect on circuit controller $C^B$.

It will be plain from the foregoing that apparatus embodying my invention provides a transmission line normally supplied with current from a main station, and an auxiliary station for supplying current automatically to the transmission line, should the supply from the main station be discontinued. One advantage of my invention is the provision of means in a distributing system of the type described, of means for automatically disconnecting one station, if both the main and the auxiliary stations simultaneously supply current to the transmission line. Another advantage is the provision of means for preventing simultaneous connection of both stations with the transmission line should the supply of current to these stations be interrupted and subsequently restored.

Although I have herein shown and described only one form of electrical switching apparatus embodying my invention, it is understood that various changes and modifications may be made therein within the scope of the appended claims without departing from the spirit and scope of my invention.

Having thus described my invention, what I claim is:

1. In an electrical distributing system the combination with a main and an auxiliary source of alternating current and a transmission line, of means for at times supplying current of one relative polarity from said main source to said transmission line, means for at times supplying current of the opposite relative polarity to said transmission line from said auxiliary source, and means responsive to the excess of current in said line when both said sources are supplying current thereto for disconnecting said auxiliary source but not said main source from said line.

2. In combination, a transmission line, a main transformer and an auxiliary transformer normally supplied with alternating current, means for normally connecting said main transformer with said transmission line, means effective upon a failure of current supply to said line from said main transformer for connecting said auxiliary transformer with said line, a circuit breaker comprising a tripping winding and a breaker contact interposed in series between said main transformer and said line, a circuit controller comprising a closing winding and breaker contacts interposed between said main transformer and said line, an inverse time element relay connected in series with said main transformer, a circuit including a back contact of said relay for short circuiting the winding of said circuit breaker, and a circuit including a contact of said circuit breaker for controlling the closing winding of said circuit controller.

3. In combination, a transmission line, a main source of alternating current normally connected with said line, an auxiliary source of alternating current, a circuit controller arranged when energized to connect said auxiliary source with said line, a first contact arranged to be closed only when said circuit controller is energized, a relay connected with said line, means controlled by a back contact of said relay for energizing said circuit controller, and means including said first contact for subsequently maintaining said circuit controller in its energized condition.

4. In combination, a transmission line, a main transformer and an auxiliary transformer, a slow acting relay connected with said auxiliary source, means responsive to the absence of current in said transmission line for connecting said main transformer with said line, and means controlled by said relay and responsive to current in said line for connecting said auxiliary transformer with said line, said relay being effective if said transformers are energized simultaneously to prevent the connection of said auxiliary transformer with said line if said main transformer supplies current to said line.

5. In combination, a transmission line, a main transformer and an auxiliary transformer, a slow acting relay connected with said auxiliary source, means responsive to the absence of current in said transmission line for connecting said main transformer with said line, and means controlled by said relay and responsive to the absence of current in said line for connecting said auxiliary transformer with said line, said relay being effective if said transformers are energized simultaneously and the main transformer fails to become connected with the line to prevent the connection of said auxiliary transformer with said line for a time interval.

6. In an electrical distributing system, the combination of a transmission line, a main source of current normally connected with said line and an auxiliary source of current normally disconnected from the line, means operating if said line breaks between said sources to connect said auxiliary source with the line and to leave the main source connected with the line, and means operating after such break is repaired to disconnect the auxiliary source from the line.

In testimony whereof I affix my signature.

ROBERT M. GILSON.